United States Patent [19]

Tokutake et al.

[11] Patent Number: 4,510,807

[45] Date of Patent: Apr. 16, 1985

[54] DIAGNOSIS METHOD OF ROTARY KILN INTERIOR

[75] Inventors: Kunihiko Tokutake, Kakogawa; Nobuo Mizokami, Ono; Hiroyuki Tanaka, Kakogawa, all of Japan

[73] Assignee: Kabushiki Kaisha Kobe Seiko Sho, Kobe, Japan

[21] Appl. No.: 506,612

[22] Filed: Jun. 22, 1983

[30] Foreign Application Priority Data

Jun. 28, 1982 [JP] Japan ............................. 57-111957

[51] Int. Cl.³ ............... G01D 21/02; G01M 19/00; G01N 33/18
[52] U.S. Cl. ................................. 73/432 R; 266/99; 177/50
[58] Field of Search ............... 73/432 V, 432 R, 32 R, 73/433, 23, 28; 177/50; 266/99

[56] References Cited

U.S. PATENT DOCUMENTS

| | | | |
|---|---|---|---|
| 2,063,775 | 12/1936 | Wilhelmi | 73/28 |
| 2,932,498 | 4/1960 | Metcalfe et al. | 73/28 X |
| 3,218,842 | 11/1965 | Ludwig et al. | 73/23 |
| 3,433,057 | 3/1969 | Halsey | 73/32 X |
| 3,593,565 | 7/1971 | Holper | 73/23 |
| 4,321,822 | 3/1982 | Marple et al. | 73/28 |
| 4,442,699 | 4/1984 | Ramelot | 73/28 |

FOREIGN PATENT DOCUMENTS

| | | | |
|---|---|---|---|
| 139300 | 12/1979 | German Democratic Rep. | 73/432 V |
| 2115933 | 9/1983 | United Kingdom | 73/32 R |
| 275712 | 6/1973 | U.S.S.R. | 73/432 V |

OTHER PUBLICATIONS

"A Study of Coal-Firing in the Grate-Kiln System"; Jan.-1977; 50th Annual Meeting Minnesota Section, AIME; B. P. Faulkner et al., pp. 1-28.
Kobe Steel Technical Bulletin R&D, vol. 32, No. 3, p. 88, (Jul. 1982).

*Primary Examiner*—Gerald Goldberg
*Assistant Examiner*—Tom Noland
*Attorney, Agent, or Firm*—Oblon, Fisher, Spivak, McClelland & Maier

[57] ABSTRACT

A method for diagnosing the interior of a rotary kiln, which method permits one to make a correct determination as to the state of deposit of ash on the inner wall of the rotary kiln. According to the method, a detector is inserted into a gas stream from the rotary kiln and kept there for a certain period of time so as to allow ash to deposit thereon. Then, the weight, density and composition of the thus-formed deposit of ash are determined. The weight is corrected in view of the ash present in pulverized coal which was used as a fuel for burners, thereby obtaining corrected ash deposit weight (Wa). The weight is also corrected in accordance with the percentage of fine iron ores present in prefired pellets and the percentage of fine iron ores present in the deposit of ash and determined by the composition of the deposit and that of the fine iron ores, thereby obtaining corrected weight (Wd) of the deposited fine iron ores. The weight of ash deposited at an elevated temperature zone in the kiln is also determined as "Ri" from Wd and the density of the deposit of ash. The extent of deposit of ash on the inner wall of the kiln is determined by comparing either one of the weight of the deposit of ash, Wa and Wd with its corresponding reference value while taking its density and optionally Ri into consideration. The above method permits one to enlarge the range of usable coal sources.

11 Claims, 5 Drawing Figures

DIAGNOSIS METHOD OF ROTARY KILN INTERIOR

BACKGROUND OF THE INVENTION (1) Field of the Invention

This invention relates to a method for diagnosing the interior of a rotary kiln employed for firing pellets of iron ore, calcining lime, sintering chromium ore or the like, and especially to a method for diagnosing the interior of such a kiln as mentioned above which method permits to make a correct determination as to the state of deposit of ash which occurs as a problem when pulverized coal is used as a indurating heat source.

The present invention will be described with the induration work of pellets of iron ore as its principal application field, but the present invention can be equally utilized in a variety of other field such as lime-calcining kilns.

(2) Description of the Prior Art

As indurating methods of iron ore pellets, there have been known, roughly breaking down, three different types of systems which are the shaft kiln system, the travelling grate system and the grate-kiln system. Among these systems, it is the grate-kiln system or its improved model that the present invention pertains to. According to the grate-kiln system, the drying and preheating (hereinafter called merely "preheating") of green pellets is carried out on a travelling grate and, after indurating the thus-preheated pellets completely in a rotary kiln, the resultant indurated pellets are then cooled in a cooling apparatus which is generally called an annular cooled. These three processing steps are allotted to different facilities respectively but these facilities are closely connected and operated practically as a single unit. For example, the heating of the travelling grate is effected in its entirety by means of burners only, which burners are provided at the discharge end of the rotary kiln. Thus, the travelling grate unit (i.e., the travelling grate) is not provided with any rows of burners and its heating is dependent on a high-temperature gas supplied from the rotary kiln. This system enjoys such merits that pellets are subjected to little disintegration thereby assuring a high production yield and a uniform firing operation, because green pellets are kept in a stationary state on pallets during their preheating periods, in which the strength of green pelllets becomes lowest, and are indurated in the rotary kiln while caused to undergo cascading therein. Besides, the heat of off gas from the rotary kiln is used as a heat source for the preheating as is and the low heat efficiency, which is considered to be a common defect of general rotary kiln systems, does not become a problem from the practical viewpoint of the grate-kiln system.

Although the grate-kiln system enjoys such merits as mentioned above, it still involves as an unsolved problem the problem common to the rotary kiln system, namely, the occurrence of rings. Therefore, rings must be removed at every scheduled shut-down which is carried out rather often. Such rings tend to develop intensively, especially, at two locations of a rotary kiln, i.e., at the feed end and an high temperature zone of the rotary kiln. As causes for the development of such rings, matter pertaining heat, heat properties of charged raw materials, the quality and quantity of iron ore dust resulting from the raw materials and the like are considered to interact, although their method of interaction has not yet been elucidated completely. On the other hand, it has become an important subject in the present field of art to regard coal as a fuel in the light of various changes surrounding oil, resulting in an change in the fuel injected from burners provided at the discharge end of each rotary kiln, or other words, leading to the conversion to pulverized coal. However, pulverized coal fuel contains a great deal of ash derived from coal and tends to promote the development of the above-mentioned rings. Thus, some coal-fired rotary kilns become unable to continue operations before their next scheduled shut-down.

It is also known that occurrence of such rings takes place in various ways or fashions depending on the type of coal and as fuel materials (place of mine and kind of coal). According to a report on "A Study of Coal Firing in the Grate-Kiln System" (addressed at the 50th AIME Annual Meeting held in January, 1977), it is mentioned that use of coal having a DP (Deposition Parameter) value over 300, which DP value is given in accordance with the following empirical equation:

$$DP = 2 \times 10^4 \times \frac{A}{H_v} \times \frac{(\% SiO_2 + \% Al_2O_3 + \% TiO_2)(\% Na_2O + \% K_2O)(\text{total } \% \text{ of other oxides})}{(\% Al_2O_3 + \% TiO_2)}$$

where A means the percentage of ash and $H_v$ stands for the net heat value (unit: British Thermal Unit/lbs.) and indicates the susceptibility of deposition of ash and its analogous substances at the feed-end of a rotary kiln, is not recommendable because deposition of ash becomes severe at the feed-end of the rotary kiln.

Furthermore, the susceptibility of ash deposition at a high temperature zone of a rotary kiln is represented by RP (Ringing Parameter). Any coals having RP values exceeding 150, which RP values are given by the following experimental equation:

$$RP = \frac{\% Fe_2O_3}{\% Al_2O_3} (2800° F. - F \cdot T)$$

where F·T means the fluid temperature of the ash in an oxidizing atmosphere, expressed in terms of °F., are said to be unrecommendable as they lead to considerable deposition of ash at the aforementioned high temperature zone. When using pulverized coal as a fuel, it is recommendable to determine DP and RP whenever the coal is changed from one supply source to another and to conduct the operation by principally using coals which satisfy DP≦300 and RP≦150. However, this operation method permits to use only coals which practically meet the above reference values. Accordingly, the above operation method is not only unable to contribute to the reduction of production cost but is also extremely poor in adaptability to situations as it cannot provide any countermeasure even if a change in the state of deposition of ash is observed following a change in operational conditions.

SUMMARY OF THE INVENTION

With the foregoing in view, a method which is capable of being successfully applied to a variety of coals to be supplied (more specifically, applicable to coals having high DP or RP values), permitting to satisfactorily use coals which have heretofore been considered as poor coals in view of their DP and RP values, and controlling the deposition of ash by precisely knowing the actual state of ash deposition and controlling the operational conditions in accordance with the actual state of ash deposition has been eagerly awaited.

The present invention has been completed taking the above-mentioned state of the art into consideration. The present inventors thought that it would be necessary to give the priority for the establishment of means for precisely determining the state of deposition of ash in a rotary kiln in order to meet the above requirements, leading to completion of this invention.

In one aspect of this invention, there is thus provided a method for diagnosing the interior of a rotary kiln operated using flames from pulverized coal burners as its heat source by determining the extent of deposition of ash and its analogous substances on the inner wall of the rotary kiln upon, after charging green pellets containing fine ore or the like as its principal raw material in a travelling grate and subjecting the green pellets to preheating, feeding the thus-preheated pellets in the rotary kiln to heat and indurate the pellets, which method comprises:

inserting detector means for the total weight of ash and its analogous substances, at a position adjacent to the discharge end of travelling grate, into the gas stream from the rotary kiln;

taking out the detector means after an elapsed time of a predetermined period;

determining the measured deposit weight (Wi) on the detector means, the deposit density ($\rho m$) and the composition of the deposit, respectively;

calculating (a) a corrected ash deposit weight (Wa) by correcting the measured deposit weight (Wi) in view of the ash weight percentage (CA) present in pulverized coal used as fuel for the burners prior to operation, (b) a corrected weight of deposited iron ore dust (Wd) by correcting the measured deposit weight (Wi) in accordance with the iron ore dust percentage (F) present in the preheated pellets in the vicinity of the discharge end of the travelling grate and the percentage of iron ore dust (C) present in the deposit and determined on the basis of the composition of the deposit and that of the iron ore dust, and (c) the ash deposit weight (Ri) at an elevated temperature region in the rotary kiln, said ash deposit weight (Ri) being determined from the corrected weight of the deposited iron ore dust (Wd) and the deposit density ($\rho m$), respectively; and determining the extent of deposition of ash and its analogous substances on the inner wall of the rotary kiln by comparing either one of Wi, Wa and Wd with its corresponding preset reference value and judging the value ($\rho m$) while taking the state of the indurating operation into consideration, or optionally further taking Ri into consideration.

The deposition of ash and its analogous substances has heretofore been controlled by such a passive measure that use of low-grade coals have been avoided. Contrary to such a conventional method, the method of this invention has made it clear that a variety of countermeasures can be taken in accordance with operational conditions and the type of coal because the present invention permits to determine the extents of ash depositions at various locations while taking the operational conditions and the type of the coal into parallel consideration. This encourages use of such low-grade coals that have conventionally been excluded from actual use. Thus, the present invention has brought about an extremely great economical effect, together with effects in the maintenance of facilities, stabilized operation, etc.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENTS

From results of observation at the above-mentioned schedule shut-down, it has become clear that the deposition of ash in a rotary kiln takes place significantly at the feed-end region and central region thereof. It is however impossible to insert measurement instruments into such regions or to obtain samples from such regions while the rotary kiln is in operation, because the rotary kiln itself is of an extremely large diameter and is kept rotating. Accordingly, it was first of all necessary to find out a region where measurements of ash are feasible. As a location as near as possible to the rotary kiln, has been chosen a region adjacent to the discharging end portion of the travelling grate.

Next, the measurement instrument disposed in the above measurement region will be described. Since it is impossible to reproduce the state of deposition of ash in the rotary kiln as is, the present inventors contemplated to assume the state of deposition of ash in the rotary kiln by catching ash present in the gas stream fed from the rotary kiln to the travelling grate. It appeared that there are both readily-depositing ash particles and hardly-depositing ash particles in the ash which has reached the measurement region while floating in the gas stream. Mere capture of such ash particles was expected to give deleterious effects to the accuracy of subsequent analyses. Accordingly, the present inventors contemplated to insert a foreign object in the above-mentioned gas stream, to take out only the ash deposit on the foreign object as a sample of deposit and then to determine the state of deposition of ash in the rotary kiln on the basis of the quantity, properties and the like of the sample. Namely, the foreign object is used as detector means for determination of the deposit ash weight. The detector means may take any shape such as a rod-like or plate-like shape provided that it permits ash and its analogous substances to deposit as uniformly as possible on its surface. It is thus unnecessary for the detector means to have any complex structure.

Figure 1:
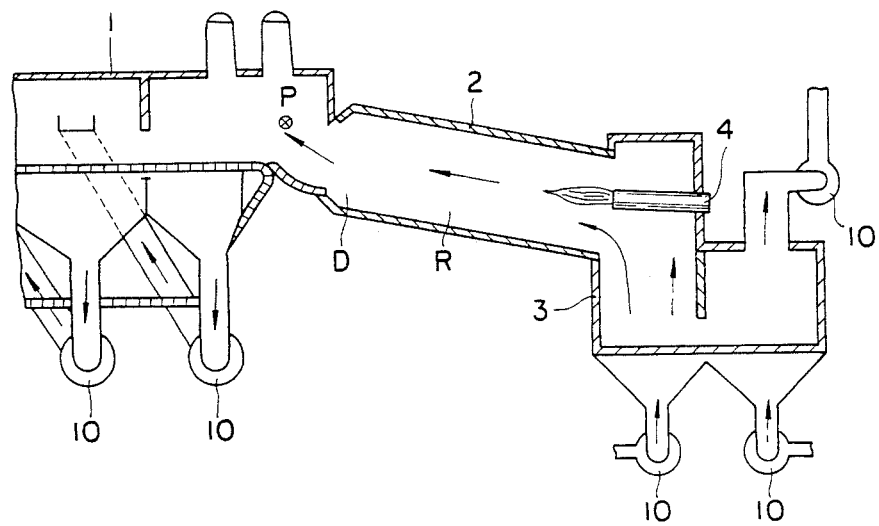
FIG. 1 is a schematic, fragmentary, vertical cross-section of pellet-indurating facilities according to the grate-kiln system.
Figure 2:
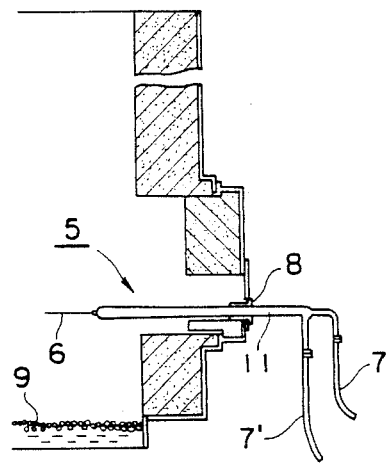
FIG. 2 is a schematic transverse cross-section showing a detector rod according to this invention, which rod has been inserted.
Figure 3:
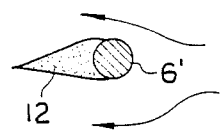
FIG. 3 is a schematic cross-sectional view of the detector rod, showing the state of ash deposit thereon.

Reference is now made to FIGS. 1 and 2, which are respectively a schematic, fragmentary, vertical cross-section of pellet indurating facilities according to the grate-kiln system and a fragmentary, transverse, cross-section of the pellet indurating facilities taken at a position where the detection rod is inserted for the determination of the weight of deposit. Namely, in the grate-kiln system, a grate 1, rotary kiln 2 and annular cooler 3 are connected together as shown in FIG. 1 and fans 10 are also arranged as illustrated in the same drawing. Since flames are blown out through burners indicated at the numeral 4, a gas stream flowing in the direction indicated by arrows is formed through the rotary kiln 2. On the other hand, pellets are successively indurated as they travel from the left to the right in FIG. 1 and finally cooled. Since the susceptibility of deposition to the region indicated by D and that to the region shown by R have been represented by a DP and RP values respectively, deposits at these regions will hereinafter be called the deposit D and deposit R respectively. It is the point P indicated by the ⓧ mark that detector 5 (see, FIG. 2) for the weight of deposit is inserted, where ash and its analogous substances present in the gas stream which has passed through the rotary kiln 2 are allowed to deposit on a detection rod 6 of the detector 5. Namely, the detector 5 is made of the detection rod 6 and a holder 11 as shown in FIG. 2 and is inserted into the furnace through a sealing unit 8. The holder 11 is continuously cooled with cooling water which is supplied and recycled through cooling water hoses 7,7'. The detection rod 6 is formed of a heat-resistant metallic material. Where the detection rod 6 is formed of a circular rod 6' for instance, ash and its analogous substances 12 are caused to deposit in such a state as shown in FIG. 3. Incidentally, the numeral 9 in FIG. 2 indicates pellets while the arrows in FIG. 3 indicate the direction of the gas stream.

The insertion of the deposit weight detector 5 may be effected at will whenever desired to carry out measurement. For example, the detector 5 may be inserted during a steadystate operation, when the pulverized coal has been changed from one source to another, when the composition of raw material pellets (e.g., the proportion of a binder such as bentonite) has been changed, or a change has been made to the operational conditions. It is most recommendable from the view point of improving the accuracy of detection to insert the detector 5 when the state of the kiln appears to have been substantially stabilized subsequent to a change thereto. It is necessary, as the insertion time of the detector 5, to give a time period enough to permit ash and its analogous substances to deposit thoroughly on the detector rod 6 and to grow there sufficiently. The insertion time period of the detector 5 may be suitably determined empirically in accordance with the size of the kiln or the state of the kiln. However, it is impossible to make correct judgements if the measurement conditions should be changed from time to time. Thus, consistent judgements may be made if time periods of insertion of the detector 5 are set at the same length, for example, if the detector 5 is kept inserted for a time period required to burn up a preset constant amount of pulverized coal (for example, 5 tons or 10 tons). Needless to say, it is recommended to maintain the consumption of pulverized coal per unit hour and the grain size distribution of pulverized coal as possible as constant whenever a measurement is effected.

The detector 5 is drawn out of the kiln when the predetermined amount of pulverized coal has been burnt. Since ash and its analogous substances deposited on the surface of the detection rod can be easily peeled off after cooling the detection rod, the weight (Wi) of the deposit is first of all measured. Then, the volume of the deposit is determined to calculate the density of the deposit. Alternatively, the density of the deposit may also be determined in accordance with the mercury methd or the like. Then, the deposit is subjected to a chemical analysis to determine its chemical components ($Fe_2O_3$, $SiO_2$, $CaO$, $Al_2O_3$, $MgO$, etc.). These chemical components are mixtures of those derived from the pulverized coal, i.e., the fuel and those originated from the starting iron ore. Thus, analysis data of chemical components provide very important information in knowing how much ash particles originated from the starting iron ore are contained in the ash deposit (in other words, how much the deposit is while taking the influence of iron ore dust released from pellets into consideration). Since there is no other possible sources for the ash deposit other than the two sources, i.e., the pulverized coal and iron ore dust, it is possible to make a correct judgement as to the degree of contribution of the iron ore dust by analyzing only two components whose original proportions are different and obtaining a solution of simultaneous binary equations. It is therefore unnecessary to make a complete analysis on each component.

$Wi, \rho m$ and the degree of contribution of iron ore dust (the percentage C of iron ore dust present in the deposit of ash) have been determined above. Where the quality of starting materials and fuel and the operational conditions (inclusive of production scale) are extremely stabilized, it is possible to determine with a relatively high degree of accuracy the states of deposition of the deposit D and deposit R on the basis of these measurement and calculation values. Namely, if Wi is greater compared with its reference value (which may be set at a suitable level in view of the interval of scheduled repairs. The reference value is set at a low value when the interval is long but at a high value when the interval is short. This applies also to Wa and Wd.), it is judged that the weight of the deposit D is also high in view of the fact that the position of the detector 5 is close to the feed end of the rotary kiln. If Wi is low compared with its reference value on the other hand, it is also judged in accordance with the same way of thinking as followed in the above that the weight of the deposit D is also small. However, it is impossible to judge as a reason for the little deposit D whether the properties of the ash and its analogous substances render them difficult to become a deposit or ash and its analogous substances have already stuck and been accumulated at a position before reaching the position where the detector is inserted (more specifically, in the elevated temperature region at the center of the kiln) after they have passed through the interior of the rotary kiln and the available total quantity of ash and its analogous substances for their deposition on the detection rod has been rendered smaller. Next, the density of the deposit of ash is taken into consideration. When the density is higher than a reference value for usual ash deposits, the state of deposition of the ash on the detection rod seems to be close to a fushion-bonded state rather than a mere build-up state. Since the fusion-bonded state should be considered to be similar to the properties of the deposit R formed at the elevated temperature region, it becomes possible to come to a conclusion that the formation of the deposit R has been promoted further than that of the deposit D. When the deposit has a low density on the other hand, it is not reasonable to follow the above idea. Namely, it seems to be correct to make such a judgement that both deposit R and deposit D are little. The percentages of coal-originated ash and fine iron ores in a deposit of ash may be determined in the following manner for example.

Paying attention for example to $SiO_2$ and $CaO$ among various components of a deposit of ash and supposing that the proportions of $SiO_2$ and $CaO$ in each of pulverized coal as a fuel and fine iron ores have been known (see, Table 1),

TABLE 1

|  | $SiO_2$ | $CaO$ |
| --- | --- | --- |
| Proportion in pulverized coal as fuel | 50.9% | 2.1% |
| Proportion in fine iron ores | 3.1% | 4.3% |
| Proportion in the deposit of ash | 27.5% | 3.1% | and representing the proportion of ash present in the deposit of ash and derived from the pulverized coal and the proportion of ash also present in the deposit of ash and derived from the fine iron ores by x% and y% respectively, the following simultaneous binary equations are established.

$$50.9x + 3.1y = 27.5$$

$$2.1x + 4.3y = 3.1$$

Thus, the solutions of these equations are determined as follows:

$$x = 51.2\%$$

$$y = 48.8\%.$$

In the above example, the ratio of the ash derived from the pulverized coal to that originated from the fine iron ores is approximately 1:1. Therefore, when the amount of the deposit D or deposit R has been judged to be too much from the determination of Wi and pm and either one of x and y is biasedly greater than the other, it is recommended to effect a change to the operation in such a direction as to reduce the formation of the deposit D or R and to contemplate a major change to the raw material having a greater degree of contribution.

When the type of coal in pulverized coal as the fuel has been changed on the other hand, it is necessary to correct the above-mentioned Wi in view of the influence of the amount of ash present in coal (%, symbol: CA) because no correct judgement can be made so long as the above-mentioned Wi is solely relied upon. The corrective equation may be established suitably whenever necessary. Although nothing will be placed outside the technical scope of this invention even if any corrective equation is used, the present inventors propose to use the following corrective equation:

$$Wa = k_1 \frac{Wi}{CA}$$

where k is a constant. Assuming that the content of ash in the pulverized coal as the fuel has become, for example, smaller after the pulverized coal was changed, compared with the content of ash in the pulverized coal before the change, the measured weight of the deposit of ash and its analogous substances (Wi) is believed to become smaller. However, it is difficult to say that actual operational conditions are always so. Supposing that, for example, Wi has not been changed substantially, it is indicated that the weight of the deposit has not been improved in spite of the reduction in the proportion of ash in the pulverized coal. This means development of new conditions which facilitate the deposition of ash more than the previous conditions, resulting in a large corrected value Wa. Thus, it is to be judged whether the conditions have been changed to ones facilitating deposition of ash or to those making deposition of ash difficult by analyzing whether the CA has been changed in the favorable direction (i.e., to a smaller one) or in the disfavorable direction (i.e., to a larger one) in combination with the phenomenon whether the Wi has been increased or decreased (in other words, by obtaining Wa in accordance with the above corrective equation). Namely, there was such tendency, according to the conventional general concept, to judge the extent of deposited ash directly on the basis of the proportion of ash in the pulverized coal used as fuel. Contrary to the conventional method, this invention has made it possible to determine the extent of deposited ash on the basis of the measured weight of deposited ash. A judgement is made whether the operation can be continued as is or not, by comparing Wa with a reference value which was chosen in accordance with the interval of scheduled shut-down. However, judgements relying upon Wa are in many instances carried out when the pulverized coal has been changed from one source to another, thereby mainly dealing with a re-change of the source for pulverized coal. Therefore, it becomes necessary to make various countermeasures which will be described below.

When there is a change in the composition of raw materials in pellets or in the production scale although the source of the pulverized coal has not been changed, it becomes necessary to take the influence of the fine iron ores into consideration. Here, a correction must be made in view of the fine iron ore, similar to the case of ash. Although no specific limitation is vested to its corrective equation in the present invention, the present inventors propose to use the following corrective equation:

$$Wd = Wi - \frac{k_2(F - \alpha) \cdot C}{100}$$

where $k_2$ and $\alpha$ are both constants, F means the proportion(%) of the fine iron ores contained in pellets at the discharging end of the travelling rate, and C denotes the proportion(%) of the fine iron ores present in the deposite of ash. The proportion of the fine iron ores, represented by F in the above equation, is normally expressed in terms of the proportion of fine iron ores and particles having diameters of 1 mm or smaller. Since the proportion of such fine iron ores and particles can be ignored to a certain extent, more specifically, to an amount up to $\alpha(\%)$ in the corrective equation, $(F - \alpha)$ is considered to be a single corrective parameter. Here, the constant $\alpha$ may be suitable selected from 0.1–1%. In addition, C(%) is the proportion of the ash resulting from the fine iron ores which proportion is obtained from the above-described simultaneous binary equations. Namely, (F−α) relates to the fine iron ores which is to be charged into a rotary kiln and is to cause deposition of ash there. On the other hand, C means the proportion of the fine iron ores in actually deposited ash. Although the aforementioned Wa is a corrected value which is changed depending on the quality of coal to be used as a fuel, Wd may be considered to be a corrected value which varies depending on the influence of the fine iron ores, in other words, the influence of pellets used as a raw material as well as the level of operation control. Thus, the latter (Wd) is expected to exhibit its effectiveness particularly in the operation control when a change has been made in the conditions of raw materials or in the operational conditions.

As to differences between the deposit D and the deposit R, it is said that the former shows the so-called physical adhesion—in which ash derived from e.g., fine iron ores is deposit while maintaining its powdery state in many instances—but the latter looks like a fused lump. This difference is believed to have arisen due to the fact that the deposit region of the former is generally at about 1100° C. while the deposit region of the latter is generally at 1300° C. or so, i.e., at extremely high temperatures. When comparing the properties of the former deposit with those of the latter deposit in terms of density, the deposit R has a high density whereas the deposit D has a low density. This difference in density has already been referred to in the above. Here, this difference in density will be discussed further by introducing the concept of Ri (ring index) so as to describe a method for making a still better judgement as to the state of formation of the deposit R on the basis of measured values obtained by the above-mentioned detector. Namely, Wi and Wa are values not taking the influence of fine iron ores into consideration too much, while Wd is a corrected value obtained by significantly taking the influence of fine iron ores into consideration as mentioned above. Deposition of rings at high-temperature zone in a rotary kiln has become a problem before pulverized coal was burned, i.e., since heavy oil was exclusively used. Accordingly, the proportion of deposit R derived from the fine iron ores is expected to be far more than the proportion of deposit R derived from coal ash, when both proportions are compared with each other. As a matter of fact, previous operational experiences teach that, when comparing operations in which pulverized coal containing a great deal of coal ash was used frequently as fuel with those carried out using more fine iron ores due to circumstances at producers' ends, the former resulted in relatively great deposit D and the latter gave apparently abundant deposit R. Therefore, these previous operational experiences justify the above-mentioned method in which the extent of deposited ash is judged by Wa when the coal has been changed from one source to another but Wd is relied upon for the same purpose when the operational conditions have been modified.

Here, the present inventors had an idea that the susceptibility of deposition R would be predicted or estimated with still higher accuracy if Wd would be corrected further to Ri by taking the density parameter into consideration. Although the present invention is not limited to any particular calculation equation regarding the determination of Ri from Wd and $\rho m$, the present inventors have found that there is an exponential correlation therebetween. The following equation has thus been proposed:

$$Ri = Wd^{k_3 \cdot \rho m}$$

where $k_3$ is a constant. It has also been found that the constant $k_3$ in the above equation can generally be given by $1/\rho c$, in which $\rho c$ is a preset reference value for the density of deposited ash and is set at a greater value where the interval of scheduled shut-down is short but at a smaller value where the same interval is long. Since it is necessary to apply a severe control to the increase of Ri where the interval of scheduled shut-down is long, it is required to set $\rho c$ at a low level (i.e., to set $k_3 \cdot \rho m$ at a high level) so as to reflect a slight increase in Wd to the Ri value sensitively. Where the interval of scheduled shut-down is short on the contrary, $\rho c$ is set at a higher level because a higher increment of Ri is acceptable.

As has been described, the present invention permits to estimate the state of development of the deposits D and R by taking, needless to say, not only the quality of coal but also operational conditions into parallel consideration. Thus, the present invention has made it possible to carry out the control of operation in such a way that the development of these deposits are minimized by readjusting all the operational conditions for a rotary kiln inversely based on the thus-obtained estimation results. Different from the prior art method in which the cause for the deposition of ash was attributed in its entirely to the coal and the range of usable coals was thus narrowed down, the present invention permits to make continuous use of the same coal as has been used by changing one or more parameters other than coal and, in some instances, provides room for studying a possible change even to coal of a lower grade, thereby considerably enlarging the range of usable coals.

Next, certain countermeasures will be described to actually control the formation of the deposits D and R.

Table 2 shows various analysis results obtained on coal samples which the present inventors used. In Table 3, there are summarized the states of operations and various analysis results for deposited ashes when the coal samples were used respectively. Whichever coal sample was used, it was possible to continue the operation successfully until the next scheduled shut-down owing to the prevention of operational trouble due to growth of deposit by controlling the operational conditions and the like.

TABLE 2

| | Coal sample No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Industrial analysis data | | | | | | | | | | | | | |
| Ash (%) | 6.19 | 7.21 | 6.09 | 10.99 | 10.04 | 10.96 | 8.82 | 7.73 | 7.67 | 7.57 | 8.62 | 9.46 | 7.42 |
| Volatiles (%) | 17.11 | 30.04 | 31.02 | 38.15 | 41.86 | 39.62 | 19.33 | 29.29 | 26.11 | 28.37 | 27.06 | 36.20 | 33.83 |
| H.G.I. | 102 | 71 | 69 | 48 | 54 | 50 | 100 | 64 | 93 | 70 | 71 | 50 | 47 |
| Heat value (Cal/g) | 7978 | 8006 | 7957 | 7002 | 7030 | 6820 | 7889 | 7731 | 7977 | 7762 | 7779 | 7456 | 7200 |
| composition of ash (%) | | | | | | | | | | | | | |

TABLE 2-continued

| | Coal sample No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| $SiO_2$ | 50.96 | 49.40 | 51.61 | 58.73 | 63.94 | 59.09 | 58.31 | 53.15 | 51.48 | 55.15 | 48.08 | 58.19 | 40.99 |
| $Al_2O_3$ | 30.81 | 28.58 | 27.91 | 18.25 | 17.65 | 14.84 | 29.94 | 27.29 | 36.38 | 30.75 | 24.21 | 25.46 | 33.52 |
| $Fe_2O_3$ | 7.62 | 9.69 | 8.90 | 3.45 | 3.51 | 4.86 | 4.90 | 9.00 | 4.23 | 5.09 | 15.42 | 6.84 | 3.69 |
| $TiO_2$ | 1.40 | 1.42 | 1.26 | 0.42 | 0.69 | 0.59 | 1.71 | 1.30 | 1.74 | 1.03 | 0.92 | 0.93 | 1.63 |
| MgO | 1.01 | 1.13 | 0.85 | 1.53 | 0.98 | 1.62 | 0.52 | 0.85 | 0.45 | 0.45 | 1.30 | 0.99 | 0.82 |
| CaO | 2.09 | 3.81 | 2.40 | 7.42 | 5.23 | 10.51 | 1.84 | 1.85 | 1.48 | 1.88 | 2.96 | 2.29 | 7.86 |
| $Na_2O$ | 0.61 | 0.64 | 0.78 | 0.63 | 0.86 | 1.70 | 0.49 | 0.30 | 0.48 | 0.15 | 0.42 | 0.60 | 0.27 |
| $K_2O$ | 2.36 | 2.40 | 2.80 | 0.72 | 1.20 | 0.72 | 1.19 | 3.50 | 0.50 | 0.87 | 2.00 | 1.10 | 0.60 |
| $P_2O_5$ | — | 0.27 | 0.21 | 0.39 | 0.46 | 0.24 | — | 0.88 | 0.89 | 1.36 | 1.49 | 0.87 | 2.12 |
| $SO_3$ | — | 1.95 | 0.27 | 2.20 | 0.82 | 2.23 | — | 0.12 | 0.07 | 0.03 | 0.21 | 0.15 | 1.45 |
| Others | — | — | — | 6.26 | — | — | — | — | — | — | — | — | — |
| Melting point (°C.) | 1403 | 1353 | 1376 | 1275 | 1300 | 1200 | 1390 | 1382 | 1410 | 1387 | 1330 | 1377 | 1403 |
| Elementary analysis (%) | | | | | | | | | | | | | |
| C | 82.55 | 80.70 | 80.88 | 70.36 | 70.26 | 68.18 | 79.59 | 77.18 | 80.75 | 77.14 | 76.58 | 73.70 | 76.21 |
| H | 4.16 | 4.82 | 4.89 | 4.72 | 4.92 | 4.50 | 4.28 | 4.74 | 4.67 | 4.66 | 4.64 | 4.87 | 4.62 |
| N | 1.12 | 1.29 | 1.27 | 1.08 | 1.21 | 0.95 | 1.62 | 1.45 | 1.55 | 1.73 | 1.61 | 1.61 | 1.68 |
| S | 0.72 | 0.69 | 0.77 | 0.53 | 0.70 | 0.54 | 0.56 | 0.47 | 0.56 | 0.44 | 0.51 | 0.58 | 0.63 |

Note: H.G.I. = Hard-groove Grindability Index $\frac{1}{\text{Work Index}}$

TABLE 3

| | Coal Sample No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Susceptibility of deposition | | | | | | | | | | | | | |
| DP | 341 | 531 | 383 | 1629 | 928 | 1827 | 350 | 534 | 200 | 299 | 884 | 589 | 402 |
| RP | 37 | 104 | 93 | 89 | 76 | 199 | 39 | 92 | 27 | 45 | 238 | 78 | 27 |
| Deposited ash | | | | | | | | | | | | | |
| Wi (g/cm$^2$) | 1.33 | 3.12 | 1.87 | 4.45 | 4.26 | 3.17 | 0.27 | 2.00 | 0.63 | 1.47 | 1.13 | 2.32 | 1.47 |
| Wa (g/cm$^2$) | 2.11 | 4.52 | 3.17 | 4.28 | 6.36 | 2.94 | 0.29 | 2.35 | 0.82 | 2.04 | 1.36 | 2.58 | 1.99 |
| C (%) | 51 | 59 | 57 | 89 | 82 | 86 | 67 | 76 | 76 | 73 | 70 | 69 | 69 |
| Composition of deposited ash (%) | | | | | | | | | | | | | |
| $SiO_2$ | 27.45 | 30.15 | 31.19 | 52.69 | 52.71 | 50.25 | 40.08 | 41.57 | 40.66 | 41.78 | 34.84 | 42.31 | 29.59 |
| $Al_2O_3$ | 17.34 | 17.95 | 18.76 | 14.85 | 14.90 | 12.81 | 21.25 | 22.09 | 30.19 | 23.12 | 18.20 | 20.07 | 24.17 |
| $Fe_2O_3$ | 46.15 | 41.99 | 38.70 | 17.96 | 18.99 | 22.06 | 28.49 | 25.45 | 19.32 | 26.03 | 34.67 | 25.78 | 31.30 |
| $TiO_2$ | 0.81 | 0.89 | 1.07 | 0.60 | 0.79 | 0.71 | 1.31 | 1.22 | 1.79 | 1.09 | 0.91 | 1.14 | 1.28 |
| MgO | 1.52 | 1.40 | 1.47 | 1.92 | 1.37 | 1.97 | 0.96 | 1.33 | 0.97 | 0.79 | 1.43 | 1.48 | 1.34 |
| CaO | 3.06 | 3.60 | 3.95 | 6.92 | 4.40 | 8.29 | 2.84 | 2.70 | 2.86 | 3.13 | 3.24 | 4.47 | 6.65 |
| $Na_2O$ | 0.60 | 0.47 | 0.66 | 0.57 | 0.66 | 1.07 | 0.71 | 0.67 | 0.57 | 0.37 | 0.49 | 0.74 | 0.39 |
| $K_2O$ | 2.51 | 2.07 | 2.99 | 1.47 | 1.84 | 1.43 | 2.92 | 4.01 | 1.91 | 2.03 | 2.63 | 2.28 | 1.74 |
| $P_2O_5$ | 0.21 | 0.16 | 0.19 | 0.26 | 0.30 | 0.17 | 0.58 | 0.67 | 0.86 | 1.05 | 0.92 | 1.06 | 1.38 |
| $SO_3$ | 0.02 | — | 0.04 | — | — | — | 0.01 | 0.08 | 0.01 | — | — | 0.03 | — |
| FeO | 0.29 | 0.51 | 0.16 | 0.60 | 0.43 | 0.50 | 0.51 | 0.18 | 0.25 | 0.25 | 0.57 | 0.23 | 0.50 |
| Ig. loss | 0.26 | 0.27 | 0.37 | 0.29 | 0.14 | 0.29 | 0.20 | 0.20 | 0.23 | 0.01 | 0.23 | 0.29 | 0.44 |
| Particle size (%) of grained coal | | | | | | | | | | | | | |
| +177μ | 7.1 | 2.9 | 3.2 | 6.1 | 6.9 | 5.1 | 4.6 | 3.4 | 0.8 | 3.1 | 3.0 | 5.5 | 4.3 |
| −88μ | 71.7 | 88.4 | 87.0 | 78.0 | 73.5 | 78.6 | 79.7 | 78.6 | 86.9 | 84.8 | 87.2 | 76.7 | 82.9 |
| −44μ | 42.6 | 54.0 | 64.8 | 47.5 | 42.3 | 50.3 | 53.4 | 42.9 | 55.3 | 57.3 | 61.3 | 45.5 | 54.6 |
| −11μ | 8.0 | 30.5 | 27.0 | 16.2 | 12.8 | 17.3 | 15.6 | 11.5 | 20.0 | 20.9 | 30.2 | 13.9 | 22.3 |
| Operational conditions | | | | | | | | | | | | | |
| Production (t/hr.) | 421 | 252 | 303 | 279 | 271 | 278 | 432 | 300 | 303 | 299 | 279 | 292 | 255 |
| Coal consumption (t/hr.) | 4.0 | 5.8 | 6.1 | 7.0 | 7.1 | 7.0 | 4.0 | 6.4 | 6.2 | 6.3 | 6.2 | 6.1 | 5.8 |
| Coal ratio (%) | 42.1 | 77.9 | 75.5 | 80.6 | 80.9 | 75.6 | 41.6 | 76.7 | 74.6 | 79.1 | 81.3 | 72.0 | 74.8 |

Note:
(1) DP, RP, Wi, Wa and C are as defined above.
(2) The coal ratio means the mixing ratio of coal to coke oven gas, i.e., the percentage of coal.

As shown in Table 3, it is only the coal sample No. 9 and No. 10 that satisfied both of the above-mentioned conditions which are generally recommendable (DP≦300; RP≦150). Especially, the coal sample No. 6 and No. 11 did not satisfy the above conditions at all and were totally unacceptable fuels if the conventional standard was applied. However, these coal samples allowed to continue the operations without encountering any inconvenience owing to adjustment of various operational conditions including changes to sources of coals. As also appreciated from the same table, DP or RP which has been conventionally adopted as reference values did not always correspond to Wi and, even if only DP is taken into consideration, it did not correspond well to Wa. Therefore, it may be concluded that DP or RP cannot be relied upon too much when controlling the deposition of ash in accordance with this invention. However, DP and RP may be used as reference when a change is made only to the type of coal. Where the deposit D has been built up to a considerable extent and it is desired to change the coal to another type, it is necessary to choose a coal having a small DP. Where the deposit R has occurred to a considerable extent and use of another type of coal is desired, it is recommendable to choose a coal having a small RP. Even in these cases, it should be judged whether the above selections of new coals were correct or not, by measuring Wi again after the state of each kiln has been stabilized subsequent to the change of coal, and especially by correcting Wi into Wa. When changing the type of coal, it is certainly possible to use only a single type of coal. Unique tendency was observed as to the development of ash deposit when two different types of coal were combined. This unique tendency will thus be described below.

Figure 4:
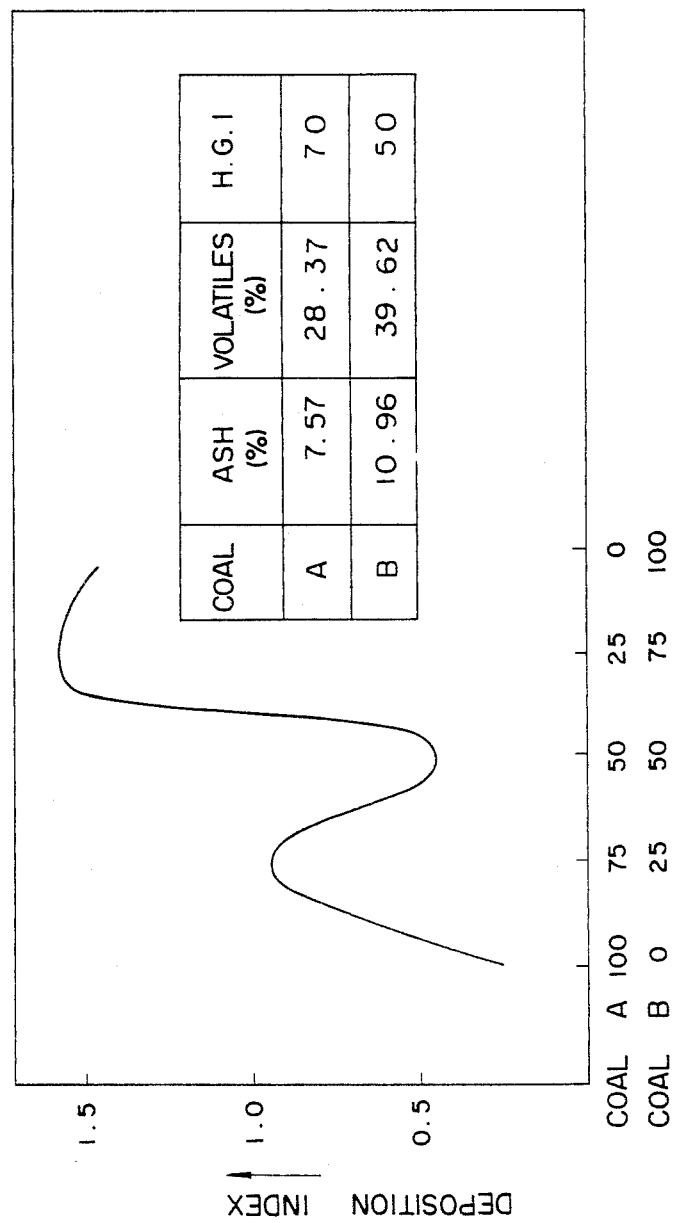
FIG. 4 is a diagram showing the relation between the mixing proportions of coals and the extent of deposit ash.

FIG. 4 shows a deposition index for each mixing ratio when two types of coal, i.e., coal A and coal B of different types were mixed in various proportions (The amount of ash deposited when coal A was used alone was supposed to be 1. The deposition index is a measure of the amount of ash deposited.) According to the diagram, the deposit of ash increases as the ratio B/A becomes larger when the ash-abundant coal B is progressively incorporated in the ash-scarce coal A. However, the maximum appears around B/A = ⅓ or so and the deposited ash decreases thereafter, reaching the minimum approximately at B/A = 1/1. Then, the deposit of ash increases as the B/A ratio increases and, after reaching the maximum again near B/A = 3/1, gradually decreases until B reaches 100%. This sort of quaternary curve is also seen in other coal compositions. The present inventors have reached to a conclusion that it is most effective to mix the coals A and B at the ratio of 1/1 or so when the economical view point is taken into consideration while achieving the principal object of reducing the amount of ash to be deposited. If the amount of deposited ash is still increased even after changing the coal to high-grade coal, it is necessary to increase the ratio of coke oven gas or the like.

Figure 5:
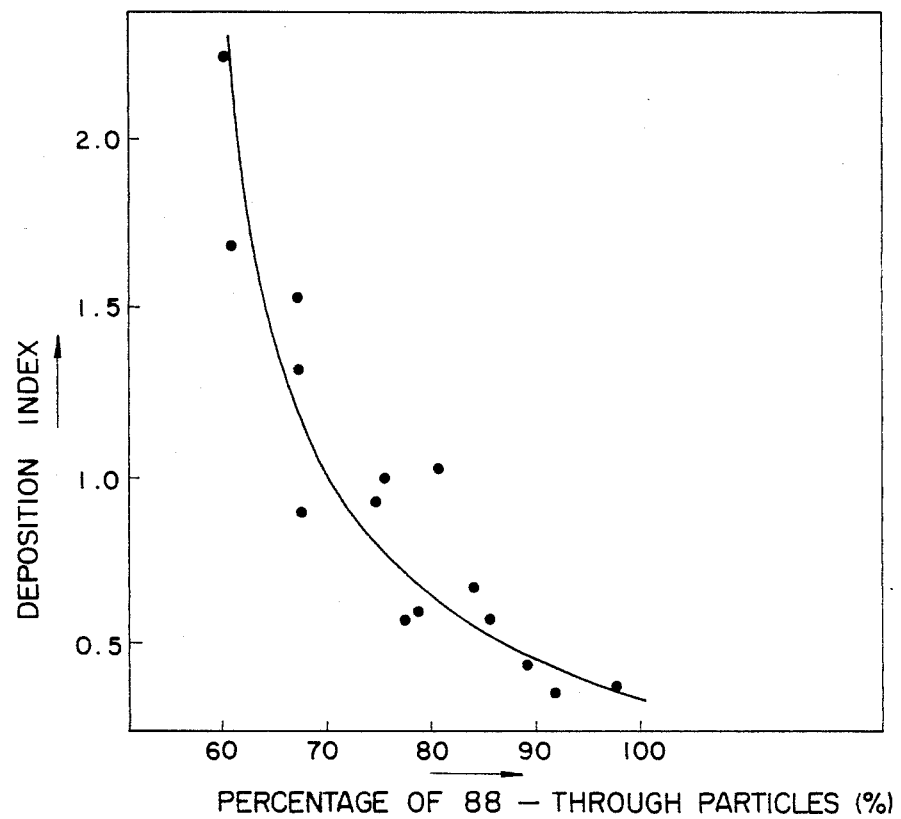
FIG. 5 is a diagram illustrating the relation between the particle size of pulverized coal and the extent of deposit ash.

Next, FIG. 5 is a diagram showing the relation between the particle size of pulverized coal (more specifically, the ratio of particles passed through a sieve having the mesh diameter of 88μ.) and deposition index (the highest possibility of continuous operation under scheduled shut-down work with a short interval being set at 1.0). The coal sample No. 8 given in Table 2 was ground in such a manner that pulverized coal samples of different grain size distributions were obtained. Study was made as to the weights of ash deposits (Wi) when thus ground coal samples were charged as fuels of pulverized coal. According to FIG. 5, Wi decreases apparently as the proportion of smaller particles of 88 μm or less becomes higher. Accordingly, it becomes one of effective countermeasures to increase the degree of comminution of the pulverized coal fuel so that the proportion of fine particles (particularly, those having diameters of 88 μm or smaller) is made higher when the value Wi, Wa or Wd (especially Wi or Wa) has been found to have increased through its determination by the aforementioned means. If Wi or the like value is sufficiently small, it is estimated that the degree of comminution of the coal has reached an unnecessarily high level (in other words, the power cost for comminution has become too high). Thus, it is possible to take such counter-measures as lowering the degree of comminution slightly or somewhat lowering the grade of the coal.

As other means to inhibit the increasing tendency of the deposit of ash, it is contemplated to adjust the production conditions, it is recommended first of all to employ such means as to change the temperatures in the kiln, thereby removing the deposit positively. Namely, separation of the deposits D and R is accelerated, for example, by lowering the temperature at the feed end of the rotary kiln when the deposit D is abundant or the temperature at the central region of the rotary kiln when the deposit R is present at a high level so as to make use of the differences in thermal expansion between the rotary kiln and the deposits D and R. The productivity will be lowered if the charging rate of pulverized coal is reduced as one method for lowering the temperature. Accordingly, it is prefrable to charge the exterior air positively to the feed end of the rotary kiln so that the temperature is lowered significantly only at the feed end of the rotary kiln or to changing the lengths of burner flames or the like so that the temperature is lowered only at the central region of the rotary kiln. As a second method, it is possible to lower the amount of iron ore dust to be carried into the rotary kiln from the grate. This method is particularly desirous as a countermeasure when the deposit R has been formed to a considerable extent. This method can be practiced, for example, by (1) increasing the proportion of the binder upon pelletizing so as to enhance the strength of resulting pellets; (2) increasing the gas quantity in the grate and drying pellets sufficiently on the grate in order to prevent occurrence of fine iron ores on the grate (the drying temperature may be somewhat lowered); or (3) allowing the sintering of pellets to proceed to a certain extent on the grate so as to protect pellets from being impacted and cracked due to the hand through which the pellets fall when feeding the rotary kiln from the grate.

Various countermeasures have been described above. However, it should be borne in mind that methods for adjusting the amount of ash to be deposited are not limited to those mentioned above but a number of other methods may be employed for the same purpose. Such methods may be practiced independently or may be combined together for still better results from the practical viewpoint.

Having now fully described the invention, it will be apparent to one of ordinary skill in the art that many changes and modifications can be made thereto without departing from the spirit or scope of the invention as set forth herein.

What is claimed is:

1. A method for diagnosing the interior of a rotary kiln operated using flames from pulverized coal burners as its heat source by estimating the extent of deposition of ash and its analogous substances on the inner wall of the rotary kiln upon, after charging the rotary kiln with a principal charging material composed of a mixture of the principal charging material in a pellet like state and in a powdery or fine state, said charging material supplied to the kiln in a travelling grate, in order to subject the charging material thus supplied to the rotary kiln to heating therein, thereby indurating said material, which method comprises:

inserting detector means for estimating the build-up of ash and its analogous substances inside the rotary kiln, at a position adjacent to the discharge end of the travelling grate, into a gas stream being blown from the rotary kiln;

taking out the detector means after an elapsed time of a predetermined period;

determining the measured deposit weight (Wi) on the detector means, the deposit density ($\rho m$) and the percentage contribution of each of a plurality of components of the deposit, respectively;

calculating (a) a corrected ash deposit weight (Wa) by correcting the measured deposit weight (Wi) in view of the ash weight percentage (CA) present in pulverized coal used as fuel for the burners, (b) a corrected weight accounting for deposited fine charging material (Wd) by correcting the measured deposit weight (Wi) in accordance with the fine charging material percentage (F) present in the prefired material in the vicinity of the discharge end of the travelling grate and the percentage (C) of the deposit resulting from the fine charging material which was determined on the basis of the determined portions of the composition of the deposit and corresponding portions of the composition of the prefired fine charging material, and (c) the ash deposit weight (Ri) for estimating the extent of the deposit at an elevated temperature region in the rotary kiln, said ash deposit weight (Ri) being determined from the corrected weight accounting for deposited fine charging material (Wd) and the deposit density ($\rho m$), respectively; and estimating the extent of deposition of ash and its analogous substances on the inner wall of the rotary kiln by choosing either any one of Wi, Wa or Wd and comparing it with a corresponding preset reference value thereof and similarly comparing the value of $\rho m$ with a corresponding preset reference value thereof and judging the value thereof or optionally further taking Ri into consideration.

2. The method according to claim 1, wherein the detector means is inserted after a change has been made to the operation conditions and the operation of the rotary kiln has then been stabilized.

3. The method according to claim 1, wherein the predetermined period is such that it permits ash and its analogous substances to deposit thoroughly and to grow to a sufficient extent to be readily measurable on the detector means.

4. The method according to claim 1, wherein the predetermined period is such a time period that a certain constant amount of pulverized coal is burnt up.

5. The method according to claim 1, wherein the deposit of ash and its analogous substances is cooled before it is removed from the detector means and is removed prior to the determination of its Wi, $\rho m$ and composition portions.

6. The method according to claim 1, wherein the detector means has a rod-like shape.

7. The method according to claim 6, wherein the detector means is made of a heat-resistant metallic material.

8. The method according to claim 1, wherein the corrected ash deposit weight (Wa) is obtained in accordance with the following corrective equation:

$$Wa = k_1 \frac{Wi}{CA}$$

where $k_1$ is a predeterminable constant.

9. The method according to claim 1, wherein the corrected weight accounting for the deposited fine charging material (Wd) is obtained in accordance with the following corrective equation:

$$Wd = Wi - \frac{k_2(F - \alpha) \cdot C}{100}$$

where $k_2$ and $\alpha$ are predeterminable constants.

10. The method according to claim 1, wherein the ash deposit weight (Ri) is obtained in accordance with the following corrective equation:

$$Ri = Wd^{k_3 \cdot \rho m}$$

where $k_3$ is a predeterminable constant.

11. The method according to claim 10, wherein $k_3$ is expressed in terms of $1/\rho c$ where $\rho c$ denotes a value preset as a reference for the density of the deposit of ash and its analogous substances.

* * * * *